United States Patent [19]

Cattron et al.

[11] Patent Number: 5,646,208
[45] Date of Patent: Jul. 8, 1997

[54] TRANSESTERIFICATION-INHIBITED POLYESTER MELT BLEND COMPOSITIONS HAVING MODIFIED THERMAL PROPERTIES

[75] Inventors: Wendell W. Cattron, Hinckley; Robert J. Schiavone, Geneva, both of Ill.

[73] Assignee: Amoco Corporation, Chicago, Ill.

[21] Appl. No.: 684,709

[22] Filed: Jul. 19, 1996

Related U.S. Application Data

[63] Continuation-in-part of Ser. No. 434,185, May 3, 1995, abandoned.
[51] Int. Cl.⁶ .................................................. C08L 67/02
[52] U.S. Cl. ..................... 524/128; 524/137; 524/151; 524/417; 525/444; 525/934
[58] Field of Search ........................ 524/128, 137, 524/151, 417; 525/444, 934

[56] References Cited

U.S. PATENT DOCUMENTS

| | | | |
|---|---|---|---|
| 2,965,613 | 12/1960 | Milone et al. | 260/75 |
| 4,069,278 | 1/1978 | Borman et al. | 260/860 |
| 4,551,368 | 11/1985 | Smith et al. | 428/35 |
| 4,704,417 | 11/1987 | Bonin | 524/140 |

FOREIGN PATENT DOCUMENTS

| | | |
|---|---|---|
| 5287044 | 11/1993 | Japan . |
| 5287067 | 11/1993 | Japan . |

*Primary Examiner*—Patricia A. Short
*Attorney, Agent, or Firm*—William C. Clarke; Mary Jo Kanady; Wallace L. Oliver

[57] ABSTRACT

This invention relates to new and useful melt blend compositions of polyethylene terephthalate and polyethylene isophthalate, and melt blend compositions of polyethylene terephthalate with random copolymers of polyethylene terephthalate and polyethylene isophthalate wherein each polyester contains an interesterification inhibitor, wherein the resulting melt blend composition of polyesters retain the predominant characteristics of the predominant polyester by weight of the melt blend composition. The extruded polymer melt blend compositions have utility as shrink fiber and film, and as adhesives in the form of powdered binders for non-woven fabrics.

10 Claims, No Drawings

TRANSESTERIFICATION-INHIBITED POLYESTER MELT BLEND COMPOSITIONS HAVING MODIFIED THERMAL PROPERTIES

This is a continuation-in-part of application Ser. No. 08/434,185, filed May 3, 1995, now abandoned.

FIELD OF THE INVENTION

This invention relates to transesterification-inhibited polyester melt blend compositions of polyethylene terephthalate with polyethylene isophthalate or polybutylene isophthalate, and to melt blend compositions of polyethylene terephthalate with random copolymers of polyethylene terephthalate and polyethylene isophthalate, each polyester modified with a transesterification inhibitor to inhibit copolymerization of the polyesters during melt blending. Such melt blend compositions demonstrate modified thermal properties according to the relative concentration of each modified polyester in the melt blend composition. Such melt blend compositions of modified polyesters have good physical properties which can be tailored for applications in shrink fiber and film and as powdered binders for non-woven fabrics.

In recent years, much activity has been devoted to the development of polymeric materials suitable for the textile and film industries. Melt blending has been used to prepare filaments for use in knitted and woven fabrics and has been used for the melt extrusion of shrink fibers and films. There are a number of methods known today for producing shrink fibers and films as well as binders for non-woven fabrics, but there still exists a need for polyester melt blend compositions with beneficial characteristics which can be tailored to specific applications in shrink fiber and film, and as powdered binders for non-woven fabrics.

Much of the development activity of polymeric materials suitable for the textile and film industries has been in the utilization of polyethylene terephthalate and, to a lesser extent, in the utilization of polyethylene isophthalate and polybutylene isophthalate. Polyethylene terephthalate has a number of characteristics such as good fiber and film forming characteristics, but it also has poor dyeability. Prior attempts to modify the characteristics of polyethylene terephthalate by preparation of other polyesters typically resulted in copolymers having a lower melting point than of either the polyethylene terephthalate or the other polyester component of the blend, indicating copolymers were resulting from the melt blend process.

High molecular weight polyethylene isophthalate has thermal properties which makes the polyester useful in adhesive applications. Polyethylene isophthalate can absorb more dye than polyethylene terephthalate, thus improving the dyeability of polyethylene terephthalate when it is used to modify polyethylene terephthalate.

Similarly, polybutylene isophthalate has thermal properties which makes it useful in adhesive applications.

It is an object of the instant invention to provide polyester melt blend compositions of polyethylene terephthalate modified with polyethylene isophthalate or polybutylene isophthalate and melt blend compositions of polyethylene terephthalate with random copolymers of polyethylene terephthalate and polyethylene isophthalate wherein the resulting melt blend composition in fiber and film applications has a high melting point, improved dyeability, good solvent resistance, can be predominantly in a crystalline state, or predominantly in an amorphous state, and demonstrates little randomization or copolymerization.

It is a further object of this invention to provide melt blends of polyethylene terephthalate and polyethylene isophthalate or polybutylene isophthalate and melt blend compositions of polyethylene terephthalate with random copolymers of polyethylene terephthalate and polyethylene isophthalate which have utility as shrink fiber and film, and as adhesives for non-woven fabrics in the form of powdered binders.

It is a further object of this invention to provide melt blends of polyethylene terephthalate and polyethylene isophthalate and melt blend compositions of polyethylene terephthalate with random copolymers of polyethylene terephthalate and polyethylene isophthalate which can be tailored to a pre-specified melting point and softening point of the polyethylene terephthalate or the polyethylene isophthalate.

It is understood that further objects of this invention will be understood from the following discussion of this invention.

BACKGROUND OF THE INVENTION

Blends of polyester fibers and methods of preparing the blends have been widely reported in the prior art. The resulting products frequently are co-polyesters. For example, U.S. Pat. No. 2,965,613 teaches a co-polyester of ethylene terephthalate-ethylene isophthalate in which the ethylene terephthalate units comprise from 90 to 15 percent of the ethylene terephthalate and ethylene isophthalate units in the co-polyester. The co-polyester is prepared by the ester interchange method and comprises linear molecules and contains two kinds of repeating units. As the ratio of the isophthalate units increased, relative to total units, the second order transition temperature of the copolymer decreased as did the softening point, and solubility in solvents increased. U.S. Pat. No. 4,551,368 teaches polyester melt blends which have high gas barrier properties which comprise blends of polyethylene isophthalate with polyethylene terephthalate or polybutylene terephthalate. The resulting melt blends have a lower melting point than either the polyethylene terephthalate or polybutylene terephthalate component of the blend, indicating the melt blend process results in a copolymer. The melt blend process can occur either through reactor blending or blending through an extruder. A third procedure involves merging two reaction melt streams together and mixing them. Conventional temperatures and catalysts are taught as useful during the transesterification of the various polyesters.

As is noted above, the melt blending of polyesters typically concerns a transesterification reaction between the two polyesters and results in a copolymer. As is also well-known, the presence of transesterification inhibitors can inhibit the polymerization reaction. U.S. Pat. No. 4,069,278 teaches that in the poly condensation of ethylene glycol and dimethyl terephthalate catalyzed by calcium acetate and antimony oxide, no phosphorus containing stabilizers (catalyst inhibitors) were added at anytime. Otherwise a blend of polybutylene terephthalate and commercial polyethylene terephthalate containing a catalyst inhibitor would not solid state polymerize to obtain a higher melt viscosity thermoplastic polyester blend using a melt blending procedure.

The utility of melt mixing two modified polyesters to produce a modified polyester which is stable in terms of thermal properties even after being exposed to a high temperature over a long period of time during fabrication is taught in Japanese Patent JP 5,287,067. The addition of an esterification inhibitor to a melt mixing of two polyesters produces a modified polyester wherein the change of thermal properties is very small. The teachings of JP 5,287,067 includes a review of methods to obtain an inhibitory effect or stoppage of the ester-exchange reaction which occurs during melt-mixing two or more different polyesters. Addition of organic or inorganic phosphorus compounds can inhibit the ester-exchange reaction, as will also the addition of a carboxylic acid ester, a carbonate ester, a carbonate compound, and a lactam compound. JP 5,287,067 teaches a preferred ester-exchange inhibitor is a monoisocyanate compound. In a similar procedure, Japanese patent JP 5,287,044 teaches monoepoxy compounds, carbondiimide compounds and oxazoline compounds can be used to inhibit the ester-exchange reaction. The addition of the inhibiting compounds to modify the resulting polyester provides a modified polyester with a high melting point which can be used for the production of fibers, films, resins, etc.

Despite the extensive prior art on the preparation of modified polyester compounds by the inhibited ester-exchange reaction, previous investigators failed to recognize the utility of a polyester composition comprising two modified polyesters, each modified polyester containing an inhibitor to inhibit an ester-exchange reaction.

It has been found that the melt blending of two modified polyesters, each polyester inhibited against an ester-exchange reaction, permits the preparation of tailored compositions with good physical properties for applications in shrink fiber and film, and when the compositions are powdered, the resulting powder can be used as a powdered binder for non-woven fabrics.

SUMMARY

This invention relates to new and useful melt blend compositions of polyethylene terephthalate (PET) and polyethylene isophthalate (PEI), and to melt blend compositions of polyethylene terephthalate with random copolymers of polyethylene terephthalate and polyethylene isophthalate, each polyester individually containing an interesterification inhibitor, wherein the resulting melt blend composition of polymers can remain predominantly crystalline or predominantly amorphous, depending upon relative concentrations of PET and PEI, upon melt extrusion. The extruded polymer melt blend compositions have utility as shrink fiber and film, and as adhesives in the form of powdered binders for nonwoven fabrics

DETAILS OF THE INVENTION

This invention discloses the preparation, properties and applications of melt blend compositions of modified polyethylene isophthalate (PEI) and modified polyethylene terephthalate (PET) and melt blend compositions of polyethylene terephthalate with random copolymers of polyethylene terephthalate and polyethylene isophthalate containing transesterification inhibitors.

As is widely known, the process of copolymerization occurs readily in the presence of polyester polymers.

It is essential that the polyester components of the polyester melt blend composition of this invention preferably contain transesterification inhibitors before melt blending in order that copolymerization not occur during the melt blending. It is further essential that an active transesterification inhibitor in an amount of from about 0.1% to about 5.0% by weight of the polyester polymer be present in each polyester.

Suitable transesterification inhibitors are well known in the art and can be selected from the group consisting of inhibitors of phosphorous containing stabilizers such as a pentaerythritol diphosphite (GE Speciality Chemicals, Parkersburg, W. Va., Ultranox® 626), phosphoric acid, and polyphosphoric acid. Other examples are zinc diisoprophyl dithiophosphate, tris(2,4-di-t-butylphenyl) phosphite, tris (monononylphenyl) phosphite and mixtures thereof.

It is further preferred that the transesterification inhibitor preferably be present in each polyester component of the melt blend composition before the melt blend step, although the addition of a transesterification inhibitor to one of the polyesters immediately prior to the melt blending typically can stabilize an individual polyester and sufficiently inhibit any transesterification reaction between the inhibited polyesters present in the melt blend.

It is further preferred that each polyester individually contain a transesterification inhibitor to reduce the possibility of reactive sites on the catalyst metals being present to facilitate a transesterification reaction.

This invention accordingly comprises a composition of two or more polyesters, each individually inhibited to retard further reaction such as transesterification and randomization to result in copolymers, wherein each polyester retains its inherent physical characteristics and provides these characteristics to the melt blend composition to the degree that each polyester is present in the melt blend composition.

It has been found that in melt blend compositions of two polyesters, for example, polyethylene terephthalate (PET) and polyethylene isophthalate (PEI), and melt blend compositions of random copolymers of PET and PEI wherein each polyester is inhibited against transesterification during a melt blending procedure, the resulting melt blend composition displays the predominant characteristics of the predominant polyester. The resulting melt blend composition also displays the physical characteristics of the less dominant polyester. For example, a melt blend composition primarily of PEI has the softening temperature of PEI, but demonstrates the crystallinity of PET which increases the solvent resistance of the composition. PET has low shrinkage, whereas PEI, which does not form fibers of high tenacity because it is amorphous, has high fiber shrinkage. However, a melt blend fiber composition of PET/PEI demonstrates an increased degree of fiber shrinkage with increased PEI content. The increased content of PEI also improves the ability of the melt blend fiber composition to obtain increased fiber shrinkage with increased spinning speed due to greater orientation of the amorphous areas in the melt blend fiber composition.

It has also been found that a specific blend of polyester polymers modified by an addition of interesterification inhibitor not only improves the high shrinkage characteristics of a polyester fiber but provides a fiber with a high melting point which is suitable for applications requiring a high temperature such as ironing or heat transfer printing, and permits the preparation of a powdered binder for nonwoven fabrics wherein the resulting bond has high strength, good high temperature performance and good solvent resistance, especially to dry cleaning solvents.

A shrink fiber made using the new and useful blend with an interesterification inhibitor can be used in a nonwoven fabric, resulting in a nonwoven fabric with increased bulk.

PET is a semi-crystalline polyester with a high melting point ($T_m$) from 255° C. to 265° C., and a high glass transition temperature ($T_g$) of from 70° C. to 80° C. It has a high solvent resistance.

PEI is an amorphous polyester with a glass transition temperature of 56° C. PEI does not crystallize from the melt or upon heating the amorphous polyester and has a low softening point, in the range of 85° C. to 90° C. However, since PEI does not crystallize, it will have a lower solvent resistance than a crystalline polyester for applications such as dry cleaning where the binder comes into contact with a solvent.

PBI is a semi-crystalline polyester with a melting point of 140° C. and a glass transition temperature of 24° C. The low glass transition temperature and the crystallinity of PBI indicate that PBI could be useful as a hot melt adhesive or powdered binder for non-woven textiles with solvent resistance.

Blends of PEI and PET prepared over a wide composition range of from 0%/100% PEI:PET to 100%/0% PEI:PET and analyzed by differential scanning calorimetry (DSC) were determined to have a single glass transition temperature, $T_g$, thus indicating the blends were miscible in all proportions The crystalline and melting transitions observed after melt extrusion corresponded to the PET phase in each blend, which indicated very little transesterification occurred during the melt extrusion blending, as determined by DSC. Upon quenching the extruded blends of polymers in cold water at a temperature of from 270° C. to about 290° C., to a temperature within the range of from about 0° C. to about 20° C., the product is an amorphous polyester blend of PEI and PET polymers.

It has been found that the application of heat to an amorphous blend of modified polyesters comprising modified polyethylene terephthalate (PET) and modified polyethylene isophthalate (PEI) each polyester modified with an ester-exchange inhibitor, to a temperature above the glass transition temperature ($T_g$) Of the PET causes the PET to crystallize. The PEI remains in an amorphous state and serves to lower the softening point of the extruded amorphous polyester melt blend before the application of heat to above the $T_g$ of the PET.

The temperature of crystallization $T_{ch}$, and the melting temperature $T_m$, of the extruded amorphous polyester blends indicate the blends do not randomize by transesterification during melt blending in the extruder. Short residence times in the extruder result in little randomization when cooled quickly from the melt extrusion. The melt blends of PEI and PET are amorphous, have a low softening point, and when ground into a powder, can be used as a binder for nonwoven fabrics. When the melt PEI-PET blend is heated to bind the nonwoven fabrics, crystallinity develops in the bond and provides a bond with a high softening point, good solvent resistance and high strength. A similar procedure of heating the PEI-PET melt blend can be used to bond labels to glass containers. The PEI-PET melt blend can be applied to the label and heated to bond the label to the glass container. The utility of the labeling procedure allows sterilizations and pasteurization of the container or contents at a high temperature because of the high temperature resistance of the bonding PEI-PET melt blends.

The inherent viscosity was measured in phenol/tetrachloroethane (60/40 v/v) where the concentration was 0.4 dl/g at a temperature of 30° C. using an Ubblehode viscometer.

The amorphous blends were characterized by differential scanning calorimetry (DSC) using a DuPont 2100 Thermal Analyzer. The polymer sample was heated a rate of 10° C. per minute from 30° to 300° C. under a nitrogen atmosphere. The glass transition temperature, peak crystallization temperature, heat of crystallization, melt point, and the heat of fusion were obtained from the DSC scan on heating.

PEI and PEI/PET melt blends were cryogenically ground in a Brinkman Ultra Centrifugal Mill, Model ZM 1. The pellets were cooled in liquid nitrogen and fed to the Brinkman mill with a 0.5 mm screen. The powder was collected and used to evaluate the effectiveness of these blends as non-woven binders.

The effectiveness of PEI/PET melt blend compositions as binders for non-woven textiles was evaluated by bonding non-woven polyester batting. Two four-inch square pieces of polyester batting weighing 10 grams total were cut from a larger roll of batting. To one of the batting pieces, the powdered polyester melt blend composition weighing 1 gram was evenly applied to the fabric. Then another piece of batting was placed on top of the treated fabric. These fabric samples containing the powdered binder were placed in a Carver laboratory press heated to 150° C. and 3.4 bars (50 psi) of pressure was applied for one minute to bond the fabric.

Qualitative evaluation of the bonding between fabric samples indicates that the composition range of 30 to 100 percent PEI produced the best bonding. Stronger and more thorough bonding was obtained in the range of 40 to 70 percent PEI. In the range of 10 to 30 percent PEI, the powder became too crystalline and failed to flow and bond with the nonwoven fabric. In the range of 70 to 100 percent PEI, the bonds did not appear to be as strong as the intermediate range of composition. This was due to lower crystallinity in this range. Crystallinity in the binder would improve the solvent resistance and strength but elongation would decrease.

Shrink fiber was prepared from blends of PET and PEI and from random copolymers of polyethylene terephthalate (PET) and polyethylene isophthalate (PEI). All of these resins were melt spun into fiber and their physical and thermal properties determined. The fiber prepared was spun in a multipurpose spinning unit with an in-line drawing system. An 80 hole spinneret was used, and the fibers were drawn to a final draw ratio of four to one. It has been found that the use of PEI to prepare copolymers of PET increases the shrinkage in a fiber by creating a greater volume fraction of amorphous regions. At levels of isophthalate modification above 10 mole %, shrinkage increased proportionately to the amount of isophthalate units used to modify the PET copolymer as is shown later in Example 4.

Two shrinkage tests were performed. The Testrite™ method uses a 2 gram weight on the fiber to simulate shrinkage under tension. The hot air oven test does not use a weight and simulates shrinkage without tension. The Testrite™ method measures only up to 25% shrinkage. The samples were placed in 80° C. hot air for 2 minutes to obtain shrinkage data.

During the spinning process, amorphous zones in the fiber are oriented. The orientation is frozen in place when the fiber is cooled below the glass transition point ($T_g$). Shrinkage occurs when these oriented amorphous zones relax during a heat treatment. The crystalline zones in the fiber act as anchors for the amorphous zones, keeping the polymer chains from sliding past each other. To obtain the maximum amount of shrinkage there must be the proper balance of oriented amorphous and crystalline zones in the fiber.

Polymerization of ethylene glycol with terephthalic acid (TA) and isophthalic acid (IA) results in a random copolymer wherein the melting point ($T_m$) is dependent upon the mole percent of the isophthalic acid present as the polymerization reactant. The $T_m$ is decreased as the mole percent of the isophthalic acid is increased relative to the mole percent of the terephthalic acid present in the copolymer formulation. It has been found that the glass transition temperature ($T_g$) also is reduced with an increased mole percent of isophthalic acid relative to the mole percent of terephthalic acid present, but to a much lesser extent. It has also been found that an increased mole percent of isophthalic acid relative to the mole percent of terephthalic acid slows the rate of thermally-induced crystallization of the resulting copolymer. Table 1 shows the effect of increasing mole percent of isophthalic acid in a polymerization reaction with ethylene glycol on the melting point ($T_m$), glass transition temperature ($T_g$) determined by heating after a quench, and thermally-induced crystalliation as measured by crystallization temperature during a slow cool, of polyester fiber after the random copolymer (RC) resins have been melt spun into fiber.

ing point of the fibers spun from random copolymers of TA/IA decreased to 228° C. at 10 mole percent isophthalate units modification and to 201.1° C. at 20 mole percent isophthalate units modification. Increased spinning speed provided only a slight increase in the melting point. This increase of only a few degrees in the melting point is considered to not make a significant difference in the thermal performance of copolymer fiber for most applications. The increased melting points of the fiber spun at faster spinning speeds are caused by increased stress-induced crystallization, which in turn is caused by the higher spinning speed. Thermal properties of fibers spun are reported in Table 2.

TABLE 1

Melting Point, $T_m$, of Polyester Fiber
(Average of all spinning speeds evaluated)

| Random Copolymer (RC) | | | | | PET/PEI Blends | | | | PET/40 Mole % Random Copolymer (RC) | | | |
|---|---|---|---|---|---|---|---|---|---|---|---|---|
| Mole % TA | Mole % IA | $T_g$ °C. | $T_m$ °C. | Crystal Temp. °C. | % PET | % PEI | $T_g$ °C. | $T_m$, °C. | Mole % PET | Mole % IA | $T_m$ °C. | $T_g$ °C. |
| 100 | 0 | 78.3 | 254.2 | 202.6 | 100 | 0 | — | — | 100 | 0 | 254.3 | 78.3 |
| 95 | 5 | — | — | — | 95 | 5 | — | — | 95 | 5 | 247.6 | 73.7 |
| 90 | 10 | 73.1 | 228.0 | 170.3 | 90 | 10 | 73.3 | 246.4 | 90 | 10 | 241.1 | 69.5 |
| 80 | 20 | 70.7 | 201.1 | N.D. | 80 | 20 | 70.1 | 241.3 | 80 | 20 | 231.8 | 67.4 |
| 70 | 30 | 69.0 | 172.6 | N.D. | 70 | 30 | 63.6 | 239.5 | 70 | 30 | — | — |
| 60 | 40 | 68.9 | N.D. | N.D. | 60 | 40 | 66.1 | 236.8 | 60 | 40 | — | — |

Note:
Mole % IA—Mole % of isophthalate units in random copolymer of terephthalic acid, isopthalic acid and ethylene glycol.
IA—Isophthalic Acid
TA—Terephthalic Acid
PET—Polyethylene terephthalate
PEI—Polyethylene isophthalate
RC—Random Copolymer - composition of polyethylene terephthalate and polyethylene isophthalate.
N.D.—Not detected.
Resins melt spun into fiber at four spinning speeds. Results of all spinning speeds evaluated were averaged as increased melt spinning speeds slightly affect $T_m$.

Thermal properties $T_m$, $T_g$, and the temperature of crystallization of cooling ($T_c$) of the fiber spun from melt blends of polyethylene terephthalate and terephthalic acid/ isopththalic acid random copolymers were determined. The melting point for the PET/random copolymer (PET/RC) blends, measured after holding the polymers in the molten state, was lower than the initial melting point because of randomization of the polymer chains caused by transesterification. Another reason that the melting point was lower, when measured after holding the polymers in the molten state, is that there was no stress-induced crystallization. Higher levels of crystallinity caused by stress-induced crystallization result in fiber with a higher melting point.

Isophthalate units are defined as the units of isophthalic acid reacted with ethylene glycol in the random copolymer of terephthalic acid, isophthalic acid and ethylene glycol.

PET/PEI blends of homopolymers of PET and PEI containing up to 20 mole percent isophthalate units produce a fiber with an initial melting point above 240° C. The PET/random copolymer of terephthalic acid, isophthalic acid and ethylene glycol (TA/IA) with a total isophthalate level of 10 percent also has an initial melting point over 240° C. These high melting points indicate that the fiber should withstand ironing, dyeing, or heat transfer printing processes, which require good thermal properties. The melt-

TABLE 2

Thermal Properties of Fibers Spun PET/PEI Homopolymers

| Mole % IA | Spinning Speed m/minutes | Initial Tg °C. | Thermal Tm °C. | Heat After Quench Tg °C. | Final Heat Tm °C. |
|---|---|---|---|---|---|
| 10 | 2400 | 58.8 | 245.0 | 72.8 | 226.1 |
| 10 | 3200 | 59.6 | 246.4 | 73.4 | 227.7 |
| 10 | 4000 | 46.1 | 247.3 | 73.9 | 231.0 |
| 10 | 4500 | 49.9 | 246.7 | 73.1 | 228.1 |
| 20 | 2400 | 67.2 | 239.6 | 69.8 | 215.3 |
| 20 | 3200 | N.D. | 241.5 | 68.2 | 212.6 |
| 20 | 4000 | 65.9 | 241.7 | 71.1 | 216.8 |
| 20 | 4500 | 61.0 | 242.3 | 70.9 | 213.7 |
| 20 | 5000 | 63.2 | 242.3 | 70.6 | 220.8 |
| 30 | 2400 | 79.5 | 237.7 | 62.3 | 222.8 |
| 30 | 3200 | 79.9 | 239.8 | 63.0 | 222.2 |
| 30 | 4000 | 79.4 | 242.3 | 65.0 | 222.0 |
| 30 | 4500 | 79.6 | 238.1 | 64.0 | 221.3 |
| 40 | 2400 | 75.7 | 232.5 | 63.6 | 205.4 |
| 40 | 3200 | 77.6 | 237.4 | 66.7 | 214.0 |
| 40 | 4000 | 77.7 | 238.2 | 65.5 | 210.8 |

Note:
IA = Isophthalate units

Increasing the spinning speed increased the tenacity and modulus, but decreased the elongation of the fibers. This is because of the increased stress-induced crystallization due to the increased air resistance on the spinning line and the increased orientation of the fiber. This effect of spinning speed on the physical properties of the fiber is shown in Table 3. The physical properties for all the fibers are reported in Table 3.

TABLE 3

Physical Properties of PET and Random Copolymers of PET and PEI

| Run Number | Mole % Isophthalate Units | Final Spinning Speed (m/min.) | Denier per Filament (g/9000 m) | Tenacity (g/denier) | Modulus (g/denier) | Elongation (%) |
|---|---|---|---|---|---|---|
| PET Homopolymer | | | | | | |
| 146-1 | 0 | 2400 | 2.7 | 3.7 | 97 | 44 |
| 147-1 | 0 | 3200 | 2.7 | 4.0 | 100 | 39 |
| Random Copolymer of PET and PEI | | | | | | |
| 153-3 | 10 | 2400 | 2.9 | 3.9 | 80 | 49 |
| 153-4 | 10 | 3200 | 2.7 | 3.4 | 82 | 44 |
| 164-1 | 20 | 2400 | 2.9 | 3.3 | 70 | 36 |
| 164-2 | 20 | 3200 | 2.9 | 3.6 | 66 | 35 |
| 164-3 | 20 | 4000 | 2.6 | 4.5 | 86 | 27 |
| 164-4 | 20 | 4500 | 2.6 | 4.8 | 78 | 27 |
| 162-1 | 30 | 2400 | 2.9 | 3.1 | 55 | 47 |
| 162-3 | 30 | 3200 | 2.9 | 3.4 | 61 | 46 |
| 162-4 | 30 | 4000 | 2.7 | 3.9 | 68 | 32 |
| 162-5 | 30 | 4500 | 2.5 | 4.2 | 73 | 27 |
| 158-1 | 40 | 2400 | 2.9 | 1.6 | 28 | 54 |
| 158-2 | 40 | 3200 | 2.9 | 2.7 | 38 | 64 |
| 158-4 | 40 | 4000 | 2.5 | 3.0 | 41 | 43 |
| 158-6 | 40 | 4500 | 1.9 | 3.3 | 59 | 31 |

The polyester melt blend composition of polyesters of the instant invention comprises (a) 10 to 90 parts by weight of a modified polyester compound of modified polyethylene terephthalate containing a transesterification inhibitor, selected from the group consisting of pentaerythritol diphosphite, phosphoric acid, polyphosphoric acid, zinc diisopropyl dithiophosphate, tris(2,4-di-t-butylphenyl) phosphite, tris(monononylphenyl)phosphite and mixtures thereof, wherein said modified polyester compound contains from 0.1 to about 5 weight percent of said transesterification inhibitor, (b) 10 to 90 parts by weight of a modified polyester compound of modified polyethylene isophthalate containing a transesterification inhibitor, selected from the group consisting of pentaerythritol diphosphite, phosphoric acid, polyphosphoric acid, zinc diisopropyl dithiophosphate, tris(2,4-di-t-butylphenyl)phosphite, tris(mono-nonylphenyl) phosphite and mixtures thereof, wherein said modified polyester compound contains from 0.1 to about 5 weight percent of said transesterification inhibitor, and wherein said polyester melt blend composition has a melting point $T_m$ within the range of from about 245° C. to about 255° C. by differential scanning calorimetry and a glass transition temperature within the range of from about 60° C. to about 80° C. by differential scanning calorimetry wherein each modified polyester compound retains its inherent physical characteristics and provides these characteristics to said melt blend composition to the degree that each modified polyester compound is present in said melt blend composition.

The polyester melt blend composition of the instant invention also comprises: (a) 60 to 90 parts by weight of said modified polyester compound of modified polyethylene terephthalate containing said transesterification inhibitor, wherein said modified polyester compound contains from 0.1 to about 5 weight percent of said transesterification inhibitor, (b) 40 to 10 parts by weight of said modified polyester compound of modified polyethylene isophthalate containing said transesterification inhibitor, wherein said modified polyester compound contains from 0.1 to about 5 weight percent of said transesterification inhibitor, and said polyester melt blend composition having a melting point $T_m$ within the range of from about 250° C. to about 255° C. by differential scanning calorimetry and a glass transition temperature $T_g$ within the range of from about 70° C. to about 79° C. by differential scanning calorimetry, and wherein said polyester melt blend composition is a linear polyester composition for fiber and film applications, and in the form of melt spun fibers and filaments exhibits up to about 30% shrinkage at 80° C. for a period of up to about 2 minutes without tension.

The polyester melt blend composition of the instant invention in the form of a powder for adhesive applications can comprise (a) 30 to 70 parts by weight of said modified polyester compound of modified polyethylene terephthalate containing said transesterification inhibitor wherein said modified polyester compound contains from 0.1 to about 5 weight percent of said transesterification inhibitor, (b) 30 to 70 parts by weight of said modified polyester compound of modified polyethylene isophthalate containing said transesterification inhibitor wherein said modified polyester compound contains from 0.1 to about 5 weight percent of said transesterification inhibitor, and said polyester melt blend composition has a melting point $T_m$ within the range of from about 248° C. to about 252° C. by differential scanning calorimetry and a glass transition temperature of from about 67° C. to about 73° C. by differential scanning calorimetry.

The polyester melt blend composition of modified polyesters of the instant invention also comprises: (a) 5 to 95 pads by weight of a modified polyester compound of modified polyethylene terephthalate containing a transesterification inhibitor, selected from the group consisting of pentaerythritol disphosphite, phosphoric acid, polyphosphoric acid, zinc diisopropyl dithiophosphate, tris(2,4-di-t- butylphenyl) phosphite, tris(monononylphenyl)phosphite and mixtures thereof, wherein said modified polyester compound contains from 0.1 to about 5 weight percent of said transesterification inhibitor, (b) 5 to 95 pads by weight of a modified polyester random copolymer compound of modified polyethylene terephthalate and of modified polyethylene isophthalate, said random copolymer containing a transesterification inhibitor, selected from the group consisting of pentaerythritol diphosphite, phosphoric acid, polyphosphoric acid, zinc diisopropyl dithiophosphate, tris(2,4-di-t-butylphenyl) phosphite, tris(monononylphenyl)phosphite and mixtures thereof, wherein said modified polyester compound contains from 0.1 to about 5 weight percent of said transesterification inhibitor. The resulting polyester melt blend composition comprising a range from about 5 mole % to about 30 mole % isophthalate units, has a melting point $T_m$ within the range of from about 250° C. to about 173° C. by differential scanning calorimetry. The resulting polyester melt blend composition comprising a range greater than about 30 mole % of isophthalate units does not demonstrate a detectable melting point range. The resulting polyester melt blend composition comprising a range of from about 5 mole % to about 95 mole % isophthalate units has a glass transition temperature ($T_g$) within the range of from about 80° C. to about 56° C. by differential scanning calorimetry.

The polyester melt blend composition of the instant invention also comprises 60 to 90 pads by weight of said modified polyester compound of modified polyethylene terephthalate containing said transesterification inhibitor, wherein said modified polyester compound contains from 0.1 to about 5 weight percent of said transesterification inhibitor, (b) 40 to 10 pads by weight of said modified polyester random copolymer compound of modified polyethylene terephthalate and modified polyethylene isophthalate, said random copolymer containing said transesterification inhibitor, wherein said modified polyester compound contains from 0.1 to about 5 weight percent of said transesterification inhibitor.

As noted above, the polyester melt blend composition of the instant invention comprising a range from about 5 mole % to about 30 mole % isophthalate units has a melting point $T_m$ within the range of from about 250° C. to about 173° C. by different scanning calorimetry. However, the glass transition temperature $T_g$ of the composition comprising a range from about 40 mole % to about 10 mole % isophthalate units is within the range of from about 80° C. to about 69° C. by differential scanning calorimetry, and said polyester melt blend composition is a linear polyester composition for fiber and film applications. The polyester melt blend composition of the instant invention comprising polyethylene terephthalate and a modified polyester random copolymer in the form of melt spun fibers and filaments can exhibit up to about 87% shrinkage at 80° C. for a period of up to about 2 minutes without tension.

The polyester melt blend composition of the instant invention also can comprise (a) 30 to 70 parts by weight of said modified polyester compound of modified polyethylene terephthalate containing said transesterification inhibitor wherein said modified polyester compound contains from 0.1 to about 5 weight percent of said transesterification inhibitor, (b) 30 to 70 parts by weight of said modified polyester random copolymer compound of modified polyethylene terephthalate and of modified polyethylene isophthalate containing said transesterification inhibitor wherein said modified polyester compound contains from 0.1 to about 5 weight percent of said transesterification inhibitor and can have a melting point $T_m$ within the range of from about 240° C. to about 220° C. by differential scanning calorimetry and a glass transition temperature of from about 77° C. to about 67° C. by differential scanning calorimetry and be in the form of a powder for adhesive applications.

The following examples illustrate the preparation, properties and application of the instant invention, but are not presented to limit the scope of the invention.

EXAMPLE 1

The following formulation was used in the preparation of poly(ethylene isophthalate) PEI.

| Raw Material | Weight Charged to Reactor |
| --- | --- |
| Ethylene glycol | 17.579 kilograms |
| Purified isophthalic acid, PIA | 39.207 kilograms |
| Choline (45% in methanol) | 5.09 grams |
| Antimony oxide | 13.25 grams |
| Polyphosphoric acid (10 percent in ethylene glycol) | 24.53 grams |

Poly(ethylene isophthalate) (PEI) was prepared from isophthalic acid (IA) and ethylene glycol using the following procedure. The monomer formulation and additive amounts are given above. The mole ratio of carboxylic acid to hydroxyl groups was 1 to 1.2. The monomers, IA and ethylene glycol, were charged to a 56 liter batch reactor which is fitted with a knock back column for separating glycol and water, a vacuum system, and an anchor helix agitator capable of handling high viscosity materials. Choline, which was also added with the monomers, was used to suppress diethylene glycol formation. The reactor was pressurized to 270 KPa (gauge) and heated to 260° C. This temperature was held at 260° C. for 135 minutes. Then the temperature was increased to 270° C. and the reactor was vented to atmospheric pressure. The knock back column was cooled with a water reflux pump which controlled the head temperature in the column to a set point of 143° C. After 175 minutes, antimony oxide was added with two 75 g washes of ethylene glycol. Then after five minutes, polyphosphoric acid in ethylene glycol was added to the reactor. After 185 minutes of reaction time, the vacuum letdown in the reactor was started by opening the reactor to a vacuum pump. The pressure was reduced at a slow rate until a pressure of 20 mm Hg was obtained and held at this pressure for 45 minutes. This was done to prevent sublimation of the cyclic dimer from the reaction mixture. The pressure was reduced to 1 mmHg during the next 20 minutes. The reactor temperature was increased to 275° C. The polycondensation was continued for 761 minutes to reach the desired melt viscosity as indicated by a torque reading on the agitator that corresponds to 0.72 inherent viscosity.

Properties of poly(butylene isophthalate) are also presented for comparison.

| Properties | Poly(ethylene isophthalate) | Poly(butylene isophthalate) |
| --- | --- | --- |
| Form | Amorphous | Semi-Crystalline |
| Inherent viscosity | 0.72 dl/g | 0.90 dl/g |
| Carboxylic acid end groups | 28.7 micro equiv./g | — |
| Glass transition temperature | 56° C. | 24° C. |
| Polymer soften temperature | 85–90° C. | 135–140° C. |
| Melting Point | — | 140° C. |

PEI pellets prepared as described above were blended with PET (Cleartuf TM 7200) pellets. The blended pellets were dried in a vacuum oven at 50° C. and 1 mmHg for 16 hours. Then the pellets were fed to a twin screw extruder driven by a Brabender Plasti-corder 7.5 horsepower drive. The screws were designed for mixing and compression. The temperature of the three zones and the nozzle were set at 280° C. The screw speed was 90–95 rpm with torque readings of 40 to 50. The melted polyester blend was fed through a ⅛ inch die at the end of the extruder. The residence time in the extruder was approximately two minutes. The strand from the die was quenched in chilled water at 4° C. and fed to a pelletizer. The amorphous polymer blend was obtained by quenching the strand in cold water. The amorphous blend was analyzed by thermal analysis and evaluated as a 20 powdered binder.

The amorphous blends were characterized by differential scanning calorimetry (DSC) using a DuPont 2100 Thermal Analyzer. The polymer sample was heated at a rate of 10° C. per minute from 30° to 300° C. under a nitrogen atmosphere. The glass transition temperature, peak crystallization temperature, heat of crystallization, melt point, and the heat of fusion were obtained from the DSC scan on heating.

PEI and PEI/PET blends were cryogenically ground in Brinkman Ultra Centrifugal Mill, Model ZM1 to prepare powders for non-woven fabric binders. The pellets were cooled in liquid nitrogen and fed to a Brinkman mill with a 0.5 mm screen. The powder was collected and used to evaluate the effectiveness of these blends as non-woven binders.

The effectiveness of PEI/PET as binders for non-woven textiles were evaluated by bonding non-woven polyester batting. Two four-inch square pieces of polyester batting weighing 10 grams total were cut from a larger roll of batting. To one of the batting pieces, the powdered polyester weighing 1 gram was evenly applied to the fabric. Then another piece of batting was placed on top of the treated fabric. These fabric samples containing the powdered binder were placed in a Carver laboratory press heated to 150° C. and 3.4 bars (50 psi) of pressure was applied for one minute to bond the fabric.

EXAMPLE 2

A sample of polyethylene terephthalate (PET) was prepared in a 15 gallon capacity reactor fitted with a knock back condensor, a vacuum system and an anchor helix agitator capable of handling high viscosity materials. A flush bottom valve on the bottom of the reactor feeds a melt pump that develops the needed pressure to feed the finished product through a six hole die, after which it is cooled in a water bath and pelletized.

The following materials were charged into the reator:

| Materials | Weight | Moles |
| --- | --- | --- |
| Ethylene Glycol | 18,307 g | 295.27 |
| Purified Terephthalic Acid (PTA) | 39,271 g | 236.23 |
| Choline (45% in methanol) | 3.58 g | |

The mole ratio of ethylene glycol to PTA was 1.25:1. Choline inhibited formation of diethylene glycol.

The ethylene glycol and choline were charged first, then the agitation was turned on to 52 rpm and the PTA was charged to the reactor.

The reactor was purged with nitrogen, and pressurized to 517 KPa (75 psi). Over the next 180 minutes, the reactor was heated to 257° C. (495° F.). Then the hot oil setpoint was increased from 260° C. (500° F.) to 266° C. (520° C.). The knockback column is cooled with a water reflux pump that controlled the head temperature of the column to a setpoint of 154° C. (310° F.). At 220 minutes, the reactor was depressurized at 103 KPa/minute (15 psi/minute). The reactor was held at atmospheric pressure with a setpoint of 266° C. (520° F.) for the next 40 minutes. 265 minutes after the start of the run, 12.93 g of antimony oxide catalyst was washed into the reactor with two 100 g washes of ethylene glycol. Nitrogen was used to charge the reactor. Five minutes later, 3.08 grams of polyphosphoric acid in 39 g ethylene glycol was washed into the reactor using a 100 g wash of ethylene glycol. Nitrogen was used to charge the reactor. Polyphosphoric acid is a heat stabilizer for the polymer.

Two hundred and eighty (280) minutes after the start of the run, the reactor pressure was reduced at a rate of 20 mm Hg per minute till the reactor reached 49 mm Hg. Over the next 10 minutes, the pressure was reduced to 20 mm Hg and held there for 20 minutes. Then the pressure was reduced at a rate of 1 mm Hg per minute till 4.4 mm Hg was obtained. The valve to the vacuum pump was left fully open till the end of the run. At the end of the run, (total run time of 689 minutes), the final pressure was 1.5 mm Hg. The setpoint of the reactor was increased in stages to 285° C. (545° F.) at the end of the run. To keep from overheating the polymer melt from the input of too much mechanical energy, the RPM of the agitator was reduced in stages from 52 RPM at 485 minutes from the start of the run to 20 RPM at the end of the run. The final temperature of the melt was 286° C. (547° F.). The final torque was 621 N-M (5500 inch pounds) at 20 RPM. The product was pelletized in 20 minutes. The product had an inherent viscosity of 0.70 dl/g determined in 60/40 phenol/1, 1, 2, 2 tetrachloroethane at 30° C. (87° F.).

EXAMPLE 3

Random copolymers of polyethylene terephthalate and polyethylene isophthalate were prepared to compare the properties of the copolymers with blends of inhibited PET and PEI polyesters. Polymers of polyethylene isophthalate were prepared and then melt blended at 280° C. with PET, each polyester containing a transesterification inhibitor.

Copolymer formulations and process data are presented in Tables 4 and 5 respectively. The mole ratio of hydroxyl to carboxyl end group levels was constant at 1.25:1. Pressure esterification (PE) was performed at 50 psi. End point for PE was determined by the temperature in the top zone (head) the distillation column. When the head temperature dropped from 305° to 296° F., the reactor was vented to atmospheric pressure. At concentrations above 20 mole %, PE time decreased as the concentration of PIA increased. Atmospheric esterification (AE) time was held constant at 60 minutes.

At the first sign of viscosity increase (torque buildup), vigorous foaming occurred. Foaming was controlled by coordinating the rate of pressure decrease with product level in the reactor. After 15–20 minutes of measurable torque increase, foaming subsided. The polycondensation time slightly increased as the concentration of PIA increased.

The formulation for the in situ preparation of polyethylene isophthalate included polyphosphoric acid as a catalyst inhibitor. Polyphosphoric acid also acted as a transesterification inhibitor.

TABLE 4

POLYETHYLENE TEREPHTHALATE/ISOPHTHALATE RANDOM COPOLYMER FORMULARY

| Materials | 10 Mole % PIA 16516-86 | 20 Mole % PIA 16516-99 | 30 Mole % PIA 16516-96 | 40 Mole % PIA 16516-93 |
|---|---|---|---|---|
| Initial Charge To the Reactor: | | | | |
| Ethylene Glycol, kg | 18.31 | 18.31 | 8.31 | 8.31 |
| PTA-33-MP, kg | 35.29 | 31.37 | 27.45 | 23.52 |
| PIA, kg | 3.92 | 7.84 | 11.76 | 15.68 |
| Choline (45% in methanol) g | 5.08 | 5.08 | 5.08 | 5.08 |
| Antimony (III) Oxide, g | 13.28 | 13.28 | 13.28 | 13.28 |
| Charged During Atmospheric Esterification: | | | | |
| Polyphosphoric Acid, g | 1.48 | 1.48 | 1.48 | 1.48 |
| Ethylene Glycol, g | 175.00 | 175.00 | 175.00 | 175.00 |
| Ratio OH:COOH | 1.25:1 | 1.25:1 | 1.25:1 | 1.25:1 |

Note:
PIA is purified isophthalic acid.

TABLE 5

POLYETHYLENE TEREPHTHALATE/ISOPHTHALATE RANDOM COPOLYMER PROCESS

| Materials | 10 Mole % PIA 16516-86 | 20 Mole % PIA 16516-99 | 30 Mole % PIA 16516-96 | 40 Mole % PIA 16516-93 |
|---|---|---|---|---|
| Water of Evolution From: | | | | |
| PE, wt. % | 79 | 85 | 96 | 86 |
| PE + AE, wt. % | 86 | 89 | 92 | 91 |
| Final Process Conditions: | | | | |
| Melt °F. | 553 | 553 | 554 | 554 |
| Oil °F. | 529 | 528 | 527 | 528 |
| Pressure, mm Hg | 0.63 | 0.84 | 0.85 | 0.86 |
| Torque @ 20 rpm, lb. in | 2400 | 2400 | 2400 | 2400 |
| Process Times: | | | | |
| PE, min. | 229 | 229 | 206 | 192 |
| AE, min. | 60 | 60 | 60 | 60 |
| Polycondensation, min. | 239 | 267 | 291 | 326 |
| Total Run Time, min. | 528 | 556 | 557 | 578 |
| Extrusion Times: | | | | |
| First product, min. | 534 | 562 | 563 | 585 |
| Final product, min. | 557 | 581 | 583 | 605 |
| Inherent Viscosity: | | | | |
| First product, dL/g | 0.65 | 0.67 | 0.69 | 0.73 |
| Final product, dL/g | 0.67 | 0.66 | 0.72 | 0.74 |

The 10% PEI Blend with PET was prepared by combining 2550 grams of 0.70 dl/g PET dry pellets, 284.4 grams of 0.73 dl/g PEI dry pellets and 14.24 g transesterification inhibitor Ultranox 626™ (bis 2,4 di-butylphenyl) pentaerythritol diphosphite), obtain from GE specialty Chemicals, Parkersburg, W. Va. These materials were placed into gallon glass jars purged with dry nitrogen, sealed with tape, and rolled for over two hours with intermittent vertical mixing of the material.

The 20% PEI Blend with PET was prepared by combining 2266 grams of 0.70 dl/g PET dry pellets, 566.7 grams of 0.73 dl/g PEI dry pellets, and 14.24 g transesterification inhibitor Ultranox 626™ (bis (2,4 di-t-butylphenyl) pentaerythritol diphosphite), obtain from GE Specialty Chemicals, Parkersburg, W. Va. These materials were placed into gallon glass jars purged with dry nitrogen, sealed with tape, and rolled for over two hours with intermittent vertical mixing of the material.

Drying procedures for the polymers varied because their melting points differed over a large range. The drying temperature had to be kept below the temperature that would cause the pellets to sinter. The drying took place in a rotary vacuum dryer at a pressure of less than 1 mm Hg. Typical drying conditions used are shown below in Table 6.

TABLE 6

DRYING CONDITIONS

| Resin | Initial Heat up Rate: | Initial Hold Temp | Hold Time | Second Heat Up Rate | Second Hold Temp. | Second Hold Time |
|---|---|---|---|---|---|---|
| PET | 1.1° C./min. (2° F./min.) | 77° C. (170° F.) | 60 min | 1.1° C./min. (2° F./min.) | 185° C. (365° F.) | 480 min. |
| 10% PIA | 1.1° C./min. (2° F./min.) | 77° C. (170° F.) | 60 min | 1.1° C./min. (2° F./min.) | 132° C. (270° F.) | 480 min. |
| Above 10% PIA | 1.1° C./min. (2° F./min.) | 65.6° C. (150° F.) | 1440 min. | None | None | None |
| PEI | 1.1° C./min. (2° F./min.) | 60° C. (140° F.) | 2880 min. | None | None | None |

TABLE 7

Thermal Properties of PEI/PET Blends from Different Scanning Calorimetry

| Blend Composition PEI/PET | Melting Point °C. Tm | Heat of Fusion J/g (cal/g) | Glass Transition °C. | Temp. of Crystallization $T_{ch}$ °C. | Heat of Crystallization J/g (cal/g) |
|---|---|---|---|---|---|
| 100/0 | — | — | 56.0 | — | — |
| 90/10 | 245.2 | 8.8 (2.1) | 63.7 | 153.8 | 8.8 (2.1) |
| 80/20 | 245.1 | 15.0 (3.6) | 65.2 | 144.7 | 10.2 (3.2) |
| 70/30 | 249.3 | 19.6 (4.7) | 67.8 | 130.6 | 13.4 (2.4) |
| 60/40 | 251.4 | 25.9 (6.2) | 67.6 | 129.4 | 15.3 (3.7) |
| 50/50 | 251.3 | 28.8 (6.9) | 69.2 | 126.6 | 17.3 (4.1) |
| 40/60 | 252.6 | 32.6 (7.8) | 70.5 | 124.8 | 20.9 (5.0) |
| 30/70 | 252.0 | 37.6 (9.0) | 73.0 | 123.0 | 22.4 (5.4) |
| 20/80 | 253.0 | 39.3 (9.4) | 76.0 | 121.9 | 23.7 (5.7) |
| 10/90 | 253.8 | 40.2 (9.6) | 78.4 | 120.6 | 25.0 (6.0) |
| 0/100 | 254.6 | 41.8 (10.0) | 78.8 | 128.8 | 30.6 (7.3) |

The data in Table 7 indicate that the melting point of the polyester melt blend compositions remains high over the entire composition range, indicating that the PET phase in the polyester melt blend composition is composed of homopolymer. The PET readily crystallizes upon heating above the glass transition temperature $T_g$. The amount of crystallinity in the polyester melt blend composition depends upon the concentration of the PET in the melt blend composition. The heat of fusion shows a higher level of crystallinity (positive deviation) than if the heat of fusion was linearly dependent upon PEI concentration. The higher crystallinity has been considered as evidence of the plasticization or nucleation of PET by PEI in the polyester melt blend composition.

The levels of the temperature of crystallization of heating $T_{ch}$ and the melting point $T_m$ indicate the polyester melt blend compositions do not randomize by transesterification during the melt blending procedure.

EXAMPLE 4

The following example illustrates the properties of shrink fiber modified with purified isophthalic acid (PIA).

At 10 mole % level of PIA modification, the melt blend composition of PET and PEI has slightly greater shrinkage than random copolymer at the same mole percent of isophthalate units. At 20 mole % PIA modification, the random copolymers exhibit greater shrinkage than the blend. The following Table 8 shows typical shrinkage results from fiber spun at 3200 meters/minute (m/min.)

TABLE 8

Shrinkage at 80° C. for Fiber Spun at 3200 m/min. (without tension)

| Mole % Isophthalate Units | Random Copolymer (% shrinkage) | PET/PEI Blends (% shrinkage) |
|---|---|---|
| 0 | 1.7 | 1.7 |
| 10 | 1.7 | 4.8 |
| 20 | 11.0 | 9.5 |
| 30 | 36.5 | — |
| 40 | 79.7 | — |

Spinning speeds in meters per minute (m/minute) which produced the highest shrinkage are presented in Table 9 below. At low spinning speeds, amorphous areas in the fiber are not oriented enough and there is not enough crystallinity developed in the fiber to obtain the maximum shrinkage. At speeds higher than that which produces the maximum shrinkage, too much crystallinity is developed in the fiber. This reduces the volume fraction of amorphous areas, and produces a fiber with less shrinkage.

TABLE 9

Spinning Speeds that Produced Highest Shrinkage

| Mole % Isophthalate Units | Random Copolymer (m/min.) | PET/PEI Blends (m/min.) |
|---|---|---|
| 0 | 2400 | 2400 |
| 10 | 2400 | 4000 |
| 20 | 3200 | 3200 |
| 30 | 2400 | — |
| 40 | 4000 | — |

Modification with more than 10 mole % isophthalate units in the random copolymers enabled increased spinning speeds at equivalent conditions. Blends of PEI and PET attained even faster spinning speeds than the random copolymers modified with PIA. Table 10 shows the maximum spinning speeds for each type of resin.

TABLE 10

Maximum Spinning Speed

| Mole % Isophthalate Units | Random Copolymer (m/min.) | PET/PEI Blends m/min.) |
|---|---|---|
| 0 | 3200 | 3200 |
| 10 | 3200 | 4500 |
| 20 | 4500 | 5000 |
| 30 | 4500 | — |
| 40 | 4500 | — |

Modification of PET with PEI prepared with purified isophthalic acid (PIA) to prepare copolymers of PET-PEI reduces the melting point ($T_m$) but has a lesser effect on the glass transition temperature ($T_g$). As compared with equivalent concentrations of isophthalate units in PET-PEI blends, modification of PET with PEI can slow the rate of thermally-induced crystallization of the polymer. Details are in Table 11.

TABLE 11

Thermal Properties of PEI/PET Copolymers and Blends

| | PET-PEI Copolymers | | | | PET-PEI Blends | |
|---|---|---|---|---|---|---|
| Mole % PIA | 0 | 10 | 20 | 30 | 10 | 20 |
| $T_m$ °C. Range | 254.1 –254.4 | 227.6 –228.4 | 200.1 –202.6 | 170.4 –174.1 | 245.0 –246.7 | 239.6 –242.3 |
| $T_g$ °C. Range | 65.4 –66.1 | 70.0 –70.7 | 68.8 –70.0 | 68.1 –72.7 | 46.1 –59.6 | 61.0 –67.2 |

EXAMPLE 5

A copolymer of polyethylene terephthalate (PET) and polyethylene isophthalate (PIA) in a mole ratio of 40% PIA prepared in the procedure of Example 3 was reacted with a commercial staple grade polyethylene terephthalate polyester (PET). The commercial PET was analyzed by x-ray fluorescence and found to contain 0.17 wt.% titanium (0.28 wt.% titanium dioxide) and had an inherent viscosity of 0.63 dl/g.

The PET blends with random copolyester modified with 40% PIA were prepared by combining dry PET pellets, dry pellets of random copolyester modified with 40% PIA prepared per procedure in Example 3, Tables 4 and 5, and transesterification inhibitor Ultranox 626 (bis(2,4 di-t-butylphenyl) pentaerythritol diphosphite) obtained from GE Specialty Chemicals. These materials were placed into a five gallon plastic bucket, purged with dry nitrogen, sealed with tape, and rolled for over two hours with intermittent vertical mixing of the material. The weights of the materials used for these blends are listed below.

Formulary for PET Blended with Random Copolyester Modified with 40% PIA

| Weight Percent PIA | Blend Component | Weight (grams) |
|---|---|---|
| 5 | Dry pellets of 0.63 dl/g PET | 9882 |
| | Dry pellets of 0.73 dl/g random copolyester modified with 40% PIA | 1412 |
| | Ultranox 626 (Bis(2,4-di-t-butylphenyl pentaerythritol diphosphite) | 56.8 |
| 10 | Dry pellets of 0.63 dl/g PET | 8467 |
| | Dry pellets of 0.73 dl/g random copolyester modified with 40% PIA | 2823 |
| | Ultranox 626 (Bis(2,4-di-t-butylphenyl) pentaerythritol diphosphite) | 56.8 |
| 20 | Dry pellets of 0.63 dl/g PET | 5647 |
| | Dry pellets of 0.73 dl/g random copolyester modified with 40% PIA | 5647 |
| | Ultranox 626 (Bis(2,4-di-t-butylphenyl) pentaerythritol diphosphite) | 56.8 |

Drying procedures for the polymers varied because their melting points differed over a large range. The drying temperature had to be kept below the temperature that would cause the pellets to sinter. The drying took place in a rotary vacuum dryer at a pressure of less than 1 mm Hg. The heat up rate to the initial hold temperature was 1.1° C./minute (2° F./minute). Drying conditions used were as follows:

Drying Conditions

| Resin | Initial Hold Temperature | Hold Time (minutes) | Second Heat Up Rate | Second Hold Temperature | Second Hold Time (minutes) |
|---|---|---|---|---|---|
| PET | 77° C. (170° F.) | 60 | 1.1° C./minute (2° F./minute) | 185° C. (365° F.) | 480 |
| 10% PIA | 77° C. (170° F.) | 60 | 1.1° C./minute (2° F./minute) | 132° C. (270° F.) | 480 |
| PET with above 10% PIA Modification | 65.6° C. (150° F.) | 1440 | None | None | None |
| PEI | 60° C. (140° F.) | 2880 | None | None | None |

That which is claimed is:

1. A polyester melt blend composition of polyesters comprising:

(a) 10 to 90 parts by weight of a modified polyester compound of modified polyethylene terephthalate containing a transesterification inhibitor, selected from the group consisting of pentaerythritol diphosphite, phosphoric acid, polyphosphoric acid, zinc diisopropyl dithiophosphate, tris(2,4-di-t-butylphenyl) phosphite, tris(monononylphenyl)phosphite and mixtures thereof, wherein said modified polyester compound contains from 0.1 to about 5 weight percent of said transesterification inhibitor, (b) 10 to 90 parts by weight of a modified polyester compound of modified polyethylene isophthalate containing a transesterification inhibitor, selected from the group consisting of pentaerythritol diphosphite, phosphoric acid, polyphosphoric acid, zinc diisopropyl dithiophosphate, tris(2,4-di-t-butylphenyl) phosphite, tris(monononylphenyl)phosphite and mixtures thereof, wherein said modified polyester compound contains from 0.1 to about 5 weight percent of said transesterification inhibitor, and (c) said polyester melt blend composition having a melting point $T_m$ within the range of from about 245° C. to about 255° C. by differential scanning calorimetry and a glass transition temperature within the range of from about 60° C. to about 80° C. by differential scanning calorimetry herein each modified polyester compound retains its inherent physical characteristics and provides these characteristics to said melt blend composition to the degree that each modified polyester compound is present in said melt blend composition.

2. The polyester melt blend composition of claim 1 comprising:

(a) 60 to 90 parts by weight of said modified polyester compound of modified polyethylene terephthalate containing said transesterification inhibitor, wherein said modified polyester compound contains from 0.1 to about 5 weight percent of said transesterification inhibitor, (b) 40 to 10 parts by weight of said modified polyester compound of modified polyethylene isophthalate containing said transesterification inhibitor, wherein said modified polyester compound contains from 0.1 to about 5 weight percent of said transesterification inhibitor, and (c) said polyester melt blend composition having a melting point $T_m$ within the range of from about 250° C. to about 255° C. and a glass transition temperature $T_g$ within the range of from about 70° C. to about 79° C. by differential scanning calorimetry, and wherein said polyester melt blend composition is a linear polyester composition for fiber and film applications.

3. The polyester melt blend composition of claim 2 wherein said composition is in the form of melt spun fibers and filaments which exhibit up to about 30% shrinkage at 80° C. for a period of up to about 2 minutes without tension.

4. The polyester melt blend composition of claim 1 comprising:

(a) 30 to 70 parts by weight of said modified polyester compound of modified polyethylene terephthalate containing said transesterification inhibitor wherein said modified polyester compound contains from 0.1 to about 5 weight percent of said transesterification inhibitor, (b) 30 to 70 parts by weight of said modified polyester compound of modified polyethylene isophthalate containing said transesterification inhibitor wherein said modified polyester compound contains from 0.1 to about 5 weight percent of said transesterification inhibitor, and (c) said polyester melt blend composition having a melting point $T_m$ within the range of from about 248° C. to about 252° C. and a glass transition temperature of from about 67° C. to about 73° C. by differential scanning calorimetry; and wherein said polyester melt blend composition is in the form of a powder for adhesive applications.

5. The polyester melt blend composition of claim 1 wherein said transesterification inhibitor is selected from the group consisting of a pentaerythritol diphosphite and polyphosphoric acid and mixtures thereof.

6. A polyester melt blend composition of modified polyesters comprising:

(a) 5 to 95 parts by weight of a modified polyester compound of modified polyethylene terephthalate containing a transesterification inhibitor, selected from the group consisting of pentaerythritol disphosphite, phosphoric acid, polyphosphoric acid, zinc diisopropyl dithiophosphate, tris(2,4-di-t-butylphenyl) phosphite, tris(monononylphenyl)phosphite and mixtures thereof, wherein said modified polyester compound contains from 0.1 to about 5 weight percent of said transesterification inhibitor, (b) 5 to 95 parts by weight of a modified polyester random copolymer compound of modified polyethylene terephthalate and of modified polyethylene isophthalate, said random copolymer containing a transesterification inhibitor, selected from the group consisting of pentaerythritol diphosphite, phosphoric acid, polyphosphoric acid, zinc diisopropyl dithiophosphate, tris(2,4-di-t-butylphenyl) phosphite, tris(monononylphenyl) phosphite and mixtures thereof, wherein said modified polyester compound contains from 0.1 to about 5 weight percent of said transesterification inhibitor, and (c) said polyester melt blend composition comprising a range from about 5 mole % to about 30 mole % isophthalate units, having a melting point $T_m$ within the range of from about 250° C. to about 173° C. by differential scanning calorimetry and said composition comprising a range of from about 5 mole % to about 95 mole % isophthalate units having a glass transition temperature $T_g$ within the range of from about 80° C. to about 56° C. by differential scanning calorimetry, wherein each modified polyester compound retains its inherent physical characteristics and provides these characteristics to said melt blend composition to the degree that each modified polyester compound is present in said melt blend composition.

7. The polyester melt blend composition of claim 6, comprising:

(a) 60 to 90 parts by weight of said modified polyester compound of modified polyethylene terephthalate containing said transesterification inhibitor, wherein said modified polyester compound contains from 0.1 to about 5 weight percent of said transesterification inhibitor, (b) 40 to 10 parts by weight of said modified polyester random copolymer compound of modified polyethylene terephthalate and modified polyethylene isophthalate, said random copolymer containing said transesterification inhibitor, wherein said modified polyester compound contains from 0.1 to about 5 weight percent of said transesterification inhibitor, and (c) said polyester melt blend composition comprising a range from about 5 mole % to about 30 mole % isophthalate units having a melting point $T_m$ within the range of from about 250° C. to about 173° C. by different scanning calorimetry and a glass transition temperature $T_g$ of said composition comprising a range from about 40 mole % to about 10 mole % isophthalate units within the range of from about 80° C. to about 69° C. by differential scanning calorimetry, and wherein said polyester melt blend composition is a linear polyester composition for fiber and film applications.

8. The polyester melt blend composition of claim 7 wherein said composition is in the form of melt spun fibers and filaments which exhibit up to about 87% shrinkage at 80° C. for a period of up to about 2 minutes without tension.

9. The polyester melt blend composition of claim 6 comprising:

(a) 30 to 70 parts by weight of said modified polyester compound of modified polyethylene terephthalate containing said transesterification inhibitor wherein said modified polyester compound contains from 0.1 to about 5 weight percent of said transesterification inhibitor, (b) 30 to 70 parts by weight of said modified polyester random copolymer compound of modified polyethylene terephthalate and of modified polyethylene isophthalate containing said transesterification inhibitor wherein said modified polyester compound contains from 0.1 to about 5 weight percent of said transesterification inhibitor, and (c) said polyester melt blend composition having a melting point $T_m$ within the range of from about 240° C. to about 220° C. and a glass transition temperature of from about 77° C. to about 67° C. by differential scanning calorimetry; and wherein said polyester melt blend composition is in the form of a powder for adhesive applications.

10. The polyester melt blend composition of claim 6 wherein said transesterification inhibitor is selected from the group consisting of pentaerythritol diphosphite, phosphoric acid, polyphosphoric acid and mixtures thereof.

* * * * *

UNITED STATES PATENT AND TRADEMARK OFFICE
CERTIFICATE OF CORRECTION

PATENT NO.: 5,646,208
DATED: July 8, 1997
INVENTOR(S): Wendell W. Cattron, Robert J. Schiavone It is certified that error appears in the above-identified patent and that said Letters Patent is hereby corrected as shown below:

| Col. | Line | | |
|---|---|---|---|
| 10 | 62-63 | "(a) 5 to 95 pads by weight" should read --(a) 5 to 95 parts by weight-- | |
| 11 | 4 | "(b) 5 to 95 pads by weight" should read --(b) 5 to 95 parts by weight-- | |
| 11 | 27 | "60 to 90 pads by weight" should read --60 to 90 parts by weight-- | |
| 11 | 32 | "(b) 40 to 10 pads by weight" should read --(b) 40 to 10 parts by weight-- | |

Signed and Sealed this

Thirtieth Day of December, 1997

Attest:

BRUCE LEHMAN

Attesting Officer

Commissioner of Patents and Trademarks